UNITED STATES PATENT OFFICE.

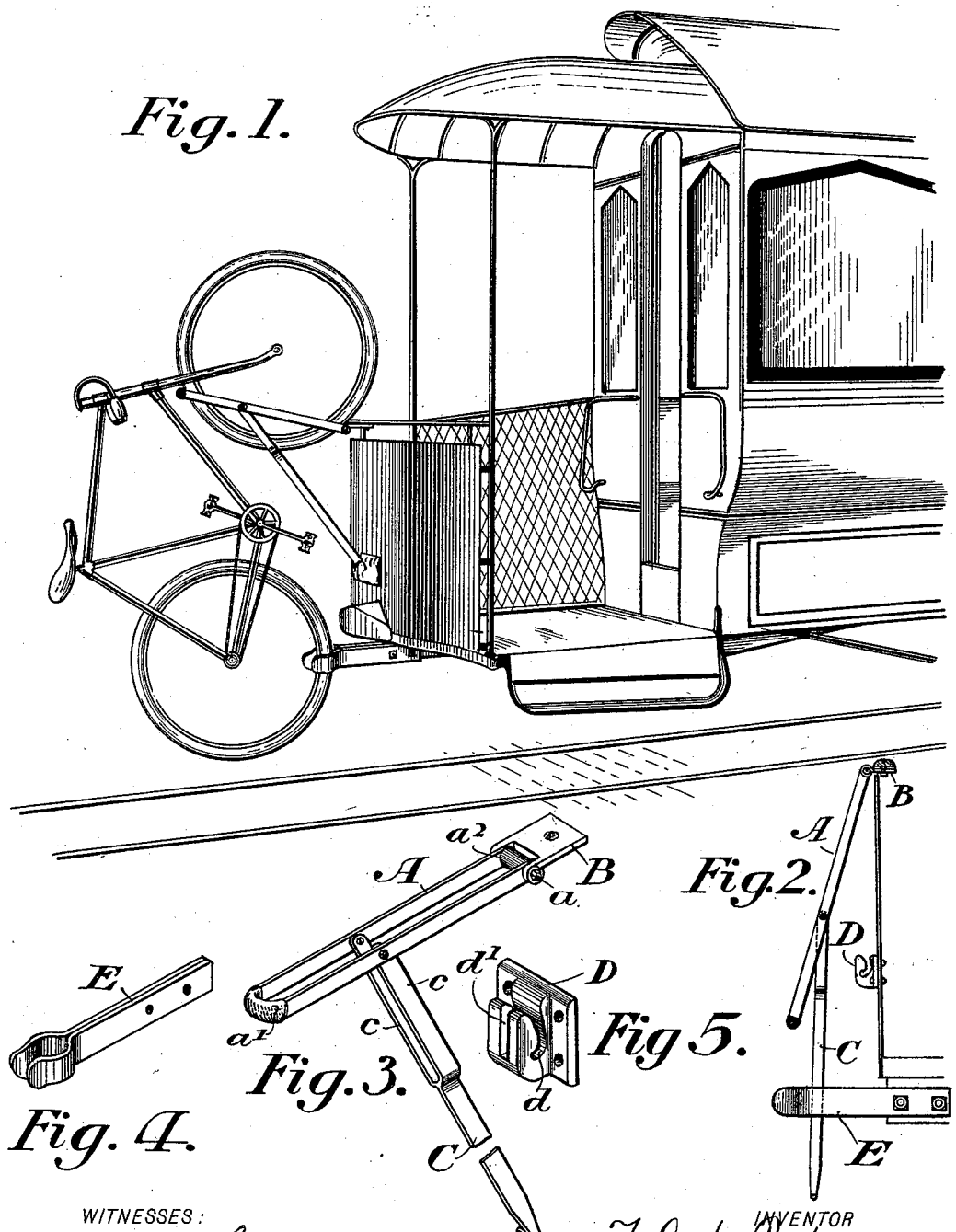

THOMAS COLEMAN DU PONT, OF JOHNSTOWN, PENNSYLVANIA.

BICYCLE-CARRIER.

SPECIFICATION forming part of Letters Patent No. 615,264, dated December 6, 1898.

Application filed September 29, 1897. Serial No. 653,413. (No model.)

*To all whom it may concern:*

Be it known that I, THOMAS COLEMAN DU PONT, of Johnstown, in the county of Cambria and State of Pennsylvania, have invented a new and useful Bicycle-Carrier, of which the following is a full, clear, and exact description, reference being had to the accompanying drawings, which form a part of this specification.

The object of my invention is to provide a carrier for bicycles which is adapted to safely and rigidly clamp a bicycle in as small a space as possible; which may be secured in the rear of a railway-car or equivalent portion of any other vehicle, so that the bicycle may be carried in a position which will not interfere with the movements of the passengers; which can be adjusted to receive the bicycle without the loss of more than a very short lapse of time; that will itself occupy the smallest possible amount of space when not needed for use, and that will be efficient in operation, simple in construction, and durable in service.

I show and will describe my invention as applied to the purpose above indicated—that is, secured to the dashboard of a street-car. It is, however, obvious that my improved carrier may be advantageously used in bicycle store-rooms, &c.

Referring to the drawings, Figure 1 represents the rear end of a car which is carrying a bicycle by means of a device embodying the features of my invention. Fig. 2 shows the same device in its inoperative position. Figs. 3, 4, and 5 show detached parts of the device.

The various elements of the device as here shown comprise a frame A for receiving the periphery of the front wheel of the bicycle, the connection B, rigidly secured to the car and to which the frame A is pivotally secured, the brace C, pivotally secured to the frame A, the brace-block D, secured to the car and adapted to receive the end of the brace C, and the spring-clip E, adapted to engage the rear wheel of the bicycle.

The frame A consists of a metallic plate or ribbon bent over upon itself to form an elongated U. The ends of the plate are connected by the bolt $a$, preferably surrounded by the rubber hose $a^2$. $a'$ is a piece of rubber hose placed about the closed end of the U. By constructing the frame in this shape it is adapted to hold a lady's bicycle without offering any interference to the dress-guard, for the mud-guard will pass over the end of the frame and there will be no bolts or other projections to engage the dress-guard.

The plate B is rigidly secured to the guard-rail of the car and receives at its end the bolt $a$, thus pivotally connecting A and B.

The brace C is fork-shaped, each of the prongs $c$ being pivotally secured to the frame A. These prongs are preferably of sufficient elasticity to be sprung apart by the wheel of the bicycle and constitute an additional engagement therewith. The lower T-shaped end of the brace is adapted to fit in the cammed slot $d$ of the block D when the carrier is in its operative position. A straight slot $d'$ is also formed in the block to receive and steady the upright portion of the brace.

When the device is not needed for use, the brace may, as shown in Fig. 2, be removed from the block D and dropped into a vertical position, where it is held by the clip E.

When a bicycle is to be placed in the carrier, the brace C is removed from the clip E, the bicycle is raised, and the front wheel inserted into the frame A. The brace is then raised and its lower end dropped into the slot $d$, and the rear wheel of the bicycle is forced into the clip E.

I desire to be understood as by no means limiting myself to the specific details of my invention shown and described, for it is evident that many modifications may be made therein without departing outside the scope of my invention.

Having thus described my invention, what I claim, and desire to protect by Letters Patent, is—

1. The combination of a wheel-holding frame, a brace pivotally secured thereto and supporting the same, and a brace-block having a vertical slot for the passage, the brace and a cam-slot for the end of said brace, said cam-slot extending downward from the top of the brace-block and curving outwardly at its lower extremity.

2. The combination of a frame pivotally mounted at one end and adapted to engage one wheel of a bicycle, a brace pivotally secured to said frame, a brace-block for sustaining the lower end of the brace when the frame is in use and a clip which engages the other wheel of the bicycle when the device is in use and which confines the lower end of the brace when the device is not in use.

In testimony whereof I have affixed my signature in presence of two witnesses.

THOMAS COLEMAN DU PONT.

Witnesses:
RICHARD EYRE,
D. R. McLAIN.